W. H. BRADLEY.
PEAT PREPARING PROCESS.
APPLICATION FILED SEPT. 14, 1908.

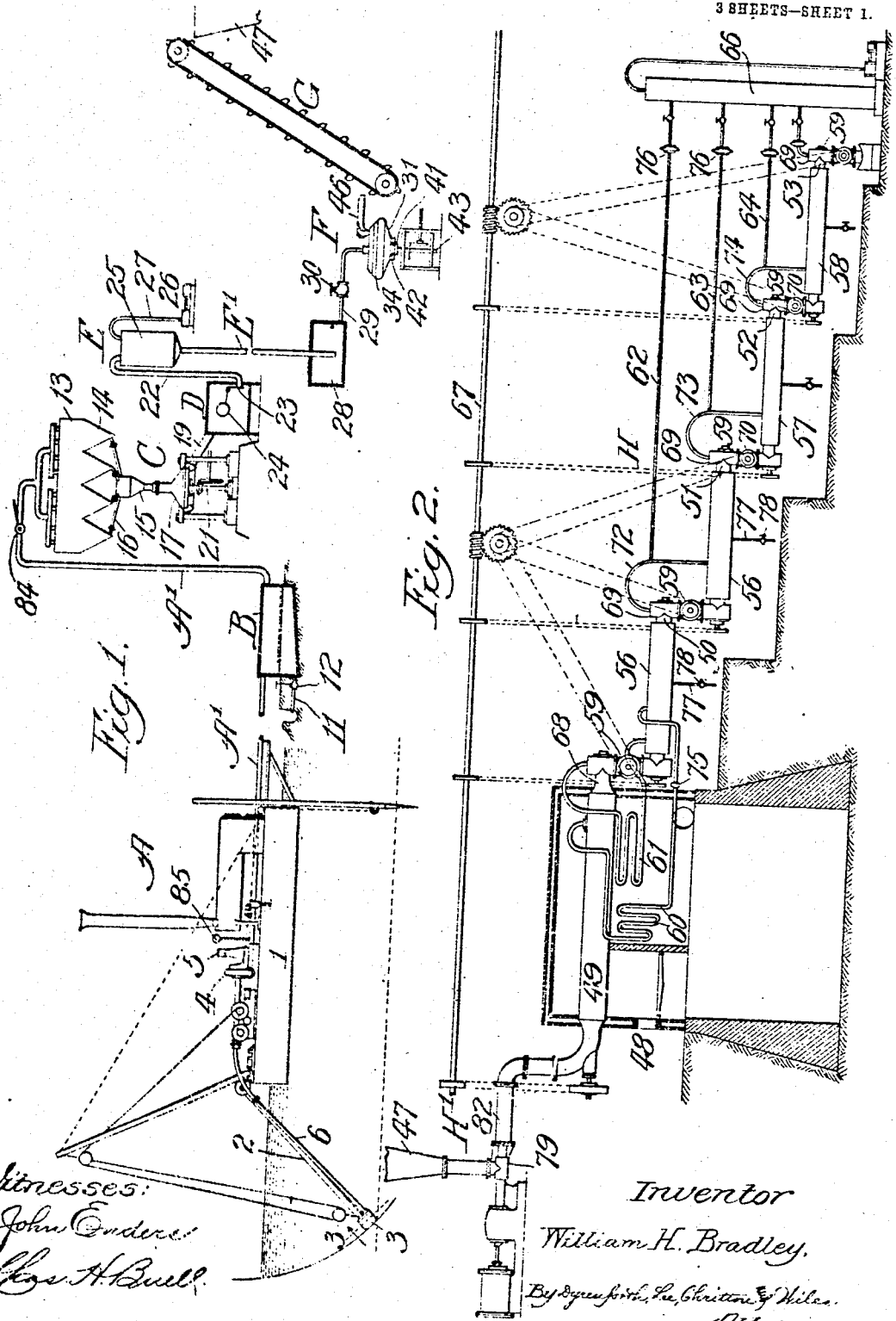

962,119.

Patented June 21, 1910.
3 SHEETS—SHEET 2.

Witnesses:
John Enders
Chas. H. Buell

Inventor:
William H. Bradley,
By Dyrenforth, Lee, Chritton & Wiles
Attys

W. H. BRADLEY.
PEAT PREPARING PROCESS.
APPLICATION FILED SEPT. 14, 1908.
962,119.
Patented June 21, 1910.
3 SHEETS—SHEET 3.
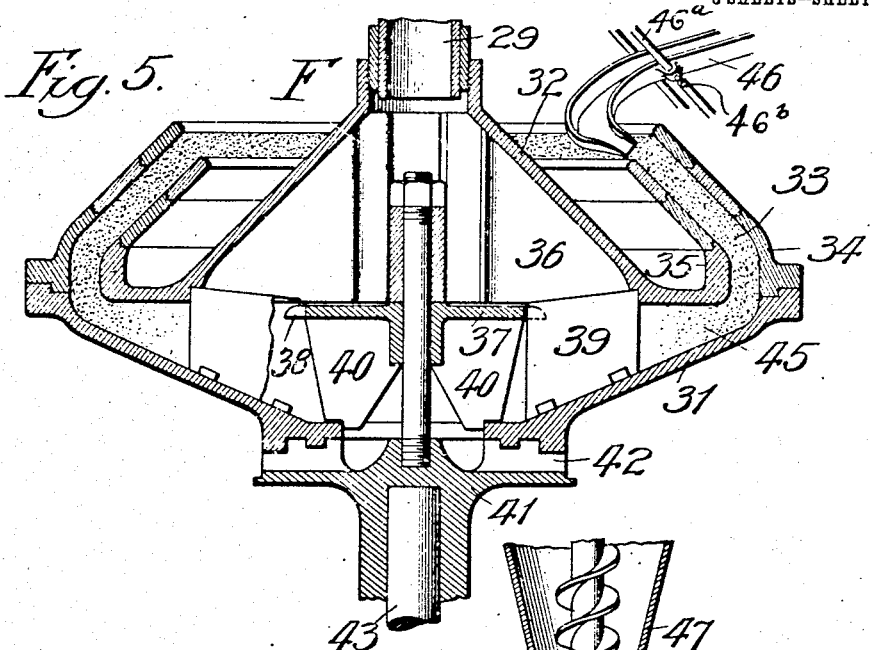
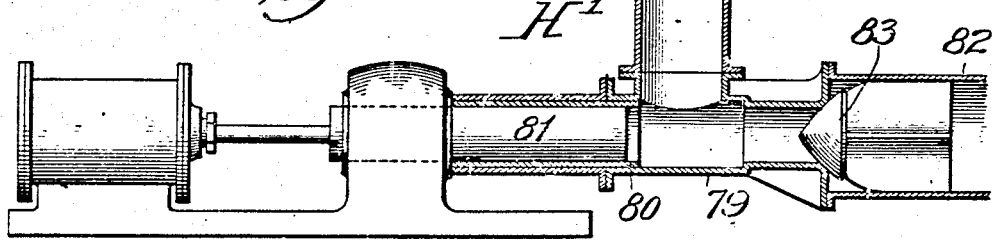
Witnesses:
John Enders
Geo. H. Buell
Inventor:
William H. Bradley.
By Dyrenforth, Lee, Chritton & Wiles
Attys.

UNITED STATES PATENT OFFICE.

WILLIAM H. BRADLEY, OF CHICAGO, ILLINOIS.

PEAT-PREPARING PROCESS.

962,119.  Specification of Letters Patent.  Patented June 21, 1910.

Application filed September 14, 1908. Serial No. 452,966.

*To all whom it may concern:*

Be it known that I, WILLIAM H. BRADLEY, a citizen of the United States, residing at Chicago, in the county of Cook and State of Illinois, have invented a new and useful Improvement in Peat-Preparing Processes, of which the following is a specification.

My invention relates particularly to the handling and treatment of peat from the bog to the prepared product; and my primary object is to provide a process for handling and treating peat, which may be economically carried on and which will enable a uniform product practically free from foreign substances to be prepared and produced on a merchantable scale.

Briefly stated, my improved process, as it is preferably carried on, is as follows: The peat is cut or broken up in the operation of taking it from the bog, and mixed with water in sufficient quantity to practically effect pension of the peat; the fluid material thus produced is hydraulically conveyed and passed through a settling-tank, or other suitable device, where the foreign substances are separated; the fluid is then passed through a combination mixing and pulverizing machine where the uniformity of the mixture is improved, the fibrous texture destroyed and the process of maceration completed; the fluid is then subjected to vacuum treatment for the purpose of removing air and occluded gases; the fluid is then subjected to centrifugal action where the peat is separated from the water of suspension; and the wet peat mass is then subjected to a multiple-effect heat treatment out of contact with the air, which leaves it ready for use as a fuel, or for use in making gas, or any other desired use.

In the accompanying drawings, I have illustrated an apparatus which may be usefully employed in practicing my improved process.

Figure 3:
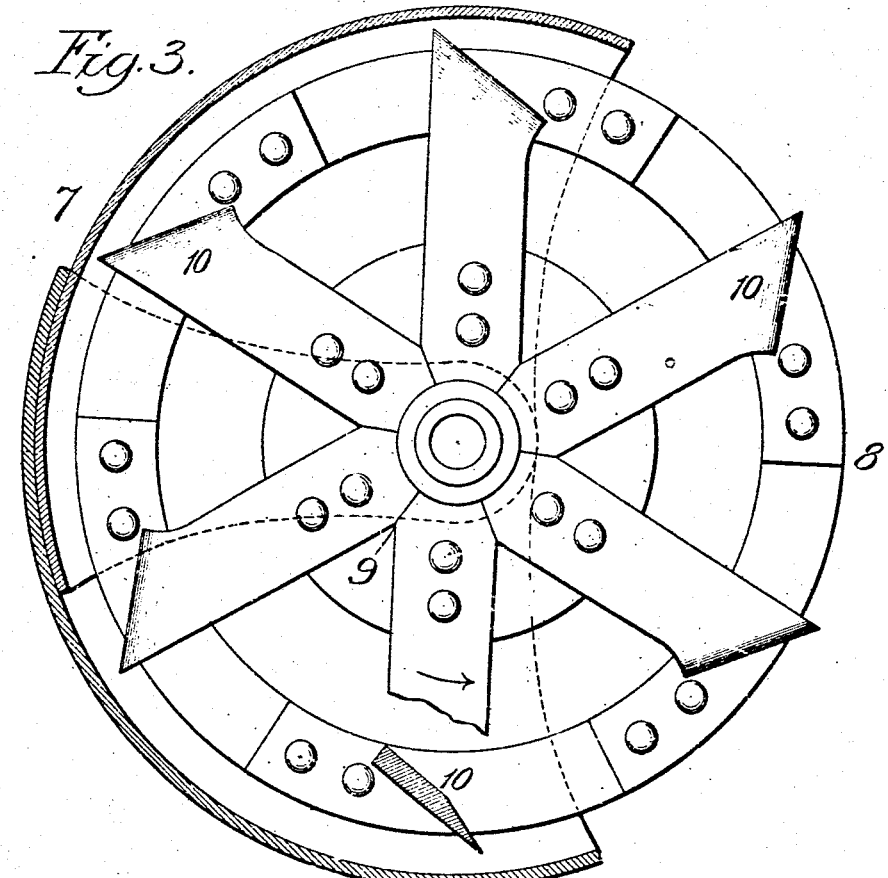
Figure 4:
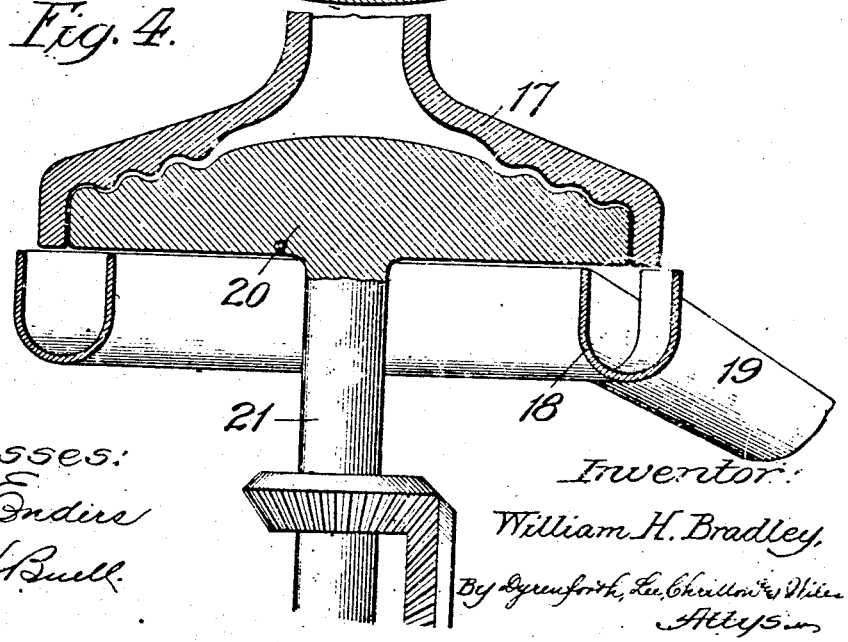

In the drawings—Figures 1 and 2 represent diagrammatically the apparatus referred to; Fig. 3 is a detail view of the cutter and suction-head employed for breaking up and mixing with water the peat in the operation of taking it from the bed or bog; Fig. 4 is a detail sectional view of the grinding or pulverizing portion of the mixing and wet-pulverizing machine; Fig. 5 is a detail sectional view of a machine for subjecting the fluid to centrifugal action to separate the peat from the water of suspension; Fig. 6 is a detail view of mechanism for feeding the wet peat mass to the multiple-effect heating apparatus; and Fig. 7 is a detail sectional view illustrating the construction of the apparatus for subjecting the wet peat mass to multiple-effect heating treatment out of atmospheric contact.

Referring to the drawings, A represents means for raising the peat from the bed or bog and mixing water with it and hydraulically conveying the same through a pipe $A^1$; B, a settling-tank, or sediment-collecting device, interposed in the course of the pipe $A^1$; C, a mixing and pulverizing machine receiving its supply from the pipe $A^1$; D, a tank into which the fluid passes from the machine C; E, vacuum apparatus receiving the fluid from the tank D and equipped with an outlet pipe $E^1$; F, a centrifugal machine receiving its supply from the pipe $E^1$ and serving to separate the peat from the water of suspension; G, an elevator serving to elevate the wet peat mass after it leaves the machine F; and H, multiple-effect heating apparatus provided with feed-mechanism $H^1$ and serving to separate the peat from the water of absorption.

The mechanism A for cutting the peat, mixing water therewith and lifting the fluid is conveniently mounted on a scow 1, and comprises a swinging arm or beam 2 equipped with a cutter and suction-head 3; and a pump 4 operated by a motor 5 and connected with the head 3 by a pipe 6. The pipe $A^1$ is connected with one side of the pump 4. The arm or beam 2 is arranged to swing in a vertical plane, and the head 3, as shown in Fig. 3, comprises a cage or casing 7 open at one side, as indicated at 8. The casing 7 comprises adjustable sections enabling the opening 8 to be regulated, thereby enabling the quantity of water taken in with the peat to be regulated. Within the head 7 is located the rotary cutter 9 provided with blades 10. In the cutting operation, the open side of the cutter-head is presented to the turf, and the cutting is effected during the upward swing of the arm 6, the boat or scow being shifted laterally as required.

The settling-tank B constitutes, in effect, a widening of the conduit $A^1$. It is provided with a drain 11 controlled by a valve 12, enabling the sediment to be discharged at will.

The mixing and pulverizing machine C comprises a tank 13 having a series of tapering channels 14 in its bottom; a discharge pipe 15 connected by branch pipes 16 with the bottoms of the troughs or channels 14; a casing 17 (Fig. 4) having a conical top and provided with an annular chamber 18 with which connects a discharge-conduit 19; and a rotary member 20 contained in the casing 17 and operated through the medium of a shaft 21. The upper surface of the member 20 conforms approximately to the conical top of the casing 17 and has a corrugated upper surface which lies adjacent to the corrugated inner surface of the top of the casing 17, thus providing for a thorough pulverizing or triturating of the material passing between the rotary member 20 and the top of the casing 17.

The tank D comprises a closed vessel equipped with an outlet pipe 22 whose orifice at the tank B is guarded by a valve 23 controlled by a float 24.

The vacuum apparatus E comprises a closed tank 25 with which the pipe 22 communicates and a pump 26 connected with the chamber 25 by a pipe 27. The pipe E¹ is shown communicating with the closed tank 28, which is preferably located at a distance of 34 feet or more below the tank 25. The tank 28 connects, through a pipe 29, with the centrifugal machine F. The pipe 29 is controlled by a valve 30.

The centrifugal machine F comprises a rotary casing having a bottom 31 and a top 32. The inlet is from the pipe 29 through the center of the top 32, and the peat outlet is through an annular channel 33 between the upturned flanges 34 and 35 with which the lower and top members 31 and 32 of the casing are equipped, respectively. The flanges 34 and 35 are shown provided with removable sections, enabling the back-pressure on the peat to be regulated. The upper member 32 of the casing is of conical form and is equipped internally with ribs or partitions 36. A deflector 37 is arranged between the lower member 31 and the upper member 32 of the casing and serves also as a spacing member. As shown, the member 37 comprises a horizontal disk adapted to spread the material as it enters through the pipe 29. Said disk is provided peripherally with notches 38 which receive partition-members 39 confined between the lower member 31 and the upper member 32 of the casing, the upper member being provided at 33 with recesses which receive the upper edge-portions of the members or plates 39. Depending from the disk-form deflector 37 are flanges 40 whose lower portions have notched engagement with the hub-portion 41 of the lower casing-member 31. The outlet for the water is through a channel or channels 42 with which the hub 41 is provided. Connected with hub 41 is a shaft 43 equipped with means 44 for effecting rotation.

In the operation of the centrifugal machine, the channel 33 is preparatorily packed with clay, dirt or other substance, adapted to offer resistance to the passage of fluid. When the water containing the peat in suspension is admitted to the centrifugal machine, the latter rotating at a high speed, the fluid is whirled with the machine and the peat is compacted in the area 45, gradually forcing the packing from the passage 33 and becoming self-sealing, preventing the fluid from finding passage through the peripheral exit of the casing. As the fluid enters through the pipe 29 under head, the water, after separation, is forced down and out through the channel 42. The internal ribs and partitions of the centrifugal machine serve to confine the fluid so that it will necessarily rotate with the machine, without lagging behind or causing eddies. Practical experimentation has demonstrated the effectiveness of separating the peat from the water of suspension by this process.

Dipping into the peripheral channel 33 is a plow, blade, or excavator, 46, adapted to remove the material from the upper portion of the passage. The plow 46 is adjustable, so that the back-pressure of the peat packed in the channel 33 may be relieved by lowering the plow and causing it to dig deeper into the material. To permit adjustment, the plow 46 is mounted on inclined supports, or guide-rods 46ª, being secured thereon by set-screws 46ᵇ (one shown).

The material is delivered by the plow 46 to the conveyer G, by means of which it is lifted to the hopper 47 of the feed-mechanism H¹, by which it is conveyed to the multiple-effect heat apparatus H.

The apparatus H comprises a furnace 48; a cylinder, or chamber 49, contained in said furnace and adapted to receive the wet peat mass from the feed-mechanism H¹; a series of cylinders, or chambers, 50, 51, 52 and 53 through which the material is conveyed, seriatim; a series of screw-conveyers 54 (Fig. 7) contained in said cylinders; a series of steam-jackets 55, 56, 57 and 58 surrounding the cylinders 50 to 53 inclusive; a series of transferring devices 59 connecting the cylinders mentioned and serving to transfer the material from cylinder to cylinder; a superheating coil 60 having one end connected with the cylinder 49 near its rear portion and the other end connected with the steam-jacket 56; a superheating coil 61 having one end connected with the upper portion of the connecting device 59 and the other end connected with the steam-jacket 56; exhaust-pipes 62, 63, 64 and 65 connecting the cylinders 50 to 53 inclusive and the jackets 56 to 58 inclusive with a condenser 66; and gear-mechanism 67 connected with the conveyers and other operative parts of the mechanism H.

The cylinder 49 preferably extends through the furnace, as shown in Fig. 2, having a reduced portion 68 projecting from the rear side of the furnace. The coil 60 is preferably connected with the cylinder 49 in front of said reduced portion. Each device 59, by means of which the material is transferred from cylinder to cylinder out of atmospheric contact and while maintaining the difference in pressures between said cylinders, as will be presently described, comprises a chamber 69 surmounting a casing 70 containing a rotary transferring-device 71. The pipe 62 is connected at its front end, by means of a pipe 72, with the chamber 69 of the first transferring-device 59 and with the steam-jacket 56. The pipe 63 is connected, by a pipe 73, in like manner, with the next transferring-device 59 and the steam-jacket 57; the pipe 64 is connected, in like manner, by a pipe 74, with the next transferring-device 59 and the steam-jacket 58; the pipe 65 is connected with the chamber 69 of the last transferring-device 59, which constitutes a terminal transferring-device from which the dried peat may be delivered to any suitable means for transferring or storing it. The outlet-portion of the superheating coil 60 is equipped with a pressure-valve 75. The pipes 62, 63, 64 and 65 are equipped with pressure-valves 76, by means of which successively lower pressures may be maintained in the series of cylinders or boilers. The steam-jackets are equipped with drain-pipes 77 controlled by valves 78.

The gear-mechanism 67 comprises suitable shafting, pulleys and belts, or other devices, for operating the several screw-conveyers and the rotary devices 71 of the transferring-devices 59.

The feed mechanism H¹, by means of which the wet peat mass is fed from the hopper 47 to the cylinder 49, comprises a cylinder 79 with the upper side of which the passage from the hopper H¹ is connected, as shown in Fig. 6; a sleeve 80 adapted to be actuated to close the discharge from the hopper 47; a piston or plunger, 81, adapted to be actuated to force the material from the cylinder 79; a discharge-conduit 82 connected with the cylinder 79 and an automatically opening and closing valve 83 located in the conduit 82. The conduit 82 connects, as shown in Figs. 2 and 7, with the front end of the cylinder 49, and the material may thus be forced by the pressure of the plunger 81 into the cylinder 49, where it comes under the action of the first screw-conveyer 54.

In the practice of my improved process, where apparatus of the character herein disclosed is employed, the peat is cut from the bog, broken up, mixed with water and hydraulically lifted by means of the mechanism A; is then conveyed hydraulically through the pipe A¹ and settling-tank B to the mixing and pulverizing machine C, the sand, shells, marl and other foreign substances, being removed or deposited at the tank B; is then passed through the mixing and pulverizing machine where uniformity of mixture is secured, pulverization of the peat effected, and the fibrous texture of the peat destroyed, the maceration, or suspension of the peat particles in water being here completed; is then passed to the vacuum apparatus where the air and occluded gases are removed; is then passed to the centrifugal machine where the peat is separated by the centrifugal action from the water of suspension; and the wet peat mass is then transferred to the multiple-effect heating apparatus H, where the drying is effected out of atmospheric contact. As the material passes through the cylinder 49 it is heated to a comparatively high temperature, say a temperature of 300°, more or less, and steam generated in the cylinder 49 is superheated to any desired degree and passed into the jacket 56. The material, issuing from the cylinder 49, is transferred by the first transferring-device 59 to the cylinder or boiler 50, through which it is transferred by the endless conveyer operating therein. Successively lower pressures are maintained in the cylinders or boilers of the multiple-effect drying apparatus, and the latent heat of the steam from one cylinder may thus be employed to boil the material in the next cylinder. By preference, the drying operation is finished at about atmospheric pressure or a little above atmospheric pressure, and the compacted and dried peat thus issues into the atmosphere in a state enabling it to be freely handled without danger of crumbling. As the material is passed through the conveyers, it is subjected to endless tumbling, and forms in pellets, or balls, so that it is in convenient form for use. It is to be noted, also, that during the drying process the central portions of the peat-masses, balls, or pellets, are at higher temperature than the exterior portions, so that there results a constant expulsion of the moisture from the center outward. The drying continues under such conditions as to obviate the premature formation of an exterior crust, so that cracking of the pellets is avoided; and, moreover, the drying is effected under pressure, which is lowered by gradations, so that a uniform compacting upon or condensing about the center of each pellet is effected, the result being an exceedingly hard, uniformly compacted product practically impervious to water and free from danger of crumbling.

In practice, the pipe A¹ is provided adjacent to the machine C with a valve 84, and means (not shown) is provided for automatically closing the valve 84 when the centrifugal machine F is stopped for any reason. The closing of the valve 84 is indicated by a pressure-gage 85 connected with the pipe A¹ near the pump 4, thus enabling the operator to stop the supply to the pipe A¹.

It should be added that in the operation of cutting the peat from the turf the cutterhead is moved from the bottom to the top of the peat-bed, so that at each swing of the arm 6 of the machine A, material is secured from the bottom to the top of the peat-bed. This material is thoroughly mixed before the centrifugal machine is reached, so that uniformity of product is assured. This uniformity of product has a two-fold value: First, it is valuable because uniformity of composition is desirable in any fuel; and second, it is valuable because uniformity of material is necessary to the operation of the centrifugal machine. Moreover, it is a necessary prerequisite to the successful operation of a centrifugal machine in the separation of peat from the water of suspension that the peat be free from fibrous texture or anything which would tend to create a channel through the peat being compacted in the annular outlet of the centrifugal machine; otherwise, the fluid would find an outlet through said channel and the separation would be prevented.

I have discovered, by experimentation, that uniformity of mixture, as regards both quality and fluidity, is an important factor in obtaining the separation of the peat from the water of suspension, i. e., in the successful operation of a centrifugal machine in effecting such separation; and it is one of the principal objects of the preliminary treatment, i. e., the treatment prior to centrifugal separation, to obtain such uniform mixture and also thoroughly macerate the peat, by which I mean the comminution or division of the peat into very fine particles in water, preferably till the consistency of cream, more or less, is obtained. In effecting the wet pulverization of the peat, it is preferred to divide it, in water, into a state approaching molecular separation, or at any rate, into minute particles, destroying as far as practicable the fibrous and cellular formation of the peat.

It may be stated that the process herein described for separating water of absorption from peat renders it possible to carry on the operation of preparing peat, regardless of weather conditions, so long as the peat can be cut and the necessary water obtained for use in carrying out the process. Thus, the process of preparing peat as herein described renders it unnecessary to depend upon the action of the sun for drying the peat.

Other methods have been proposed for drying peat artificially, but so far as I am aware, it has not been proposed to employ a multiple-effect heating system, making use of the latent heat of steam to effect the boiling operations at successively reduced pressures.

The foregoing detailed description has been given for clearness of understanding only, and no undue limitation is to be understood therefrom.

What I regard as new, and desire to secure by Letters Patent, is—

1. In the preparation of peat, the process of treatment, which consists in macerating the peat to a state of finely divided particles suspended in water and then separating the peat from the water of suspension by centrifugal action.

2. In the preparation of peat, the process of treatment, which consists in macerating the peat, subjecting the fluid to vacuum treatment to remove air and occluded gases, and then, by centrifugal action, separating the peat from the water of suspension.

3. In the preparation of peat, the process of treatment, which consists in macerating the peat, to a state of finely-divided particles suspended in water then separating the peat from the water of suspension by centrifugal action, and finally subjecting the wet peat mass thus obtained to heat action while out of atmospheric contact to remove the water of absorption.

4. In the preparation of peat, the process of treatment, which consists in first macerating the peat, to a state of finely-divided particles suspended in water then subjecting the resulting fluid to centrifugal action to remove the water of suspension, and finally mechanically moving the separated peat across a source of heat while out of atmospheric contact to remove the water of absorption.

5. In the preparation of peat, the process of treatment, which consists in breaking up the peat and mixing it with water, conveying the fluid thus obtained hydraulically and subjecting to action to complete the maceration to a state of suspension in water in finely-divided particles, separating by gravitation the impurities during the course of flow, and then subjecting the macerated peat to centrifugal action to remove the water of suspension.

6. In the preparation of peat, the process of treatment, which consists in breaking up the peat and mixing it with water, conveying the fluid thus obtained hydraulically, separating the impurities by gravity during the course of flow, completing the maceration to a state of suspension of the peat in fine particles in water, subjecting the macerated peat to centrifugal action to remove the water of suspension, and finally mechanically moving the wet peat mass thus obtained across a source of heat to remove the water of absorption.

7. In the treatment of peat, the process of cutting or breaking up peat and mixing it with water, conveying the resulting fluid hydraulically, subjecting the stream to the action of a macerator capable of completing the maceration to a state of suspension of finely divided particles, and subjecting the thoroughly macerated material to centrifugal action, thereby separating the water of suspension.

8. The process of handling and treating peat, which consists in cutting or breaking up and hydraulically lifting the peat and water mixed therewith from the peat-bed, subjecting the hydraulic stream to the action of a macerator to complete the maceration, subjecting the macerated material to vacuum treatment to remove occluded gases, and subjecting the fluid to centrifugal action to separate the water of suspension.

9. The process of handling and treating peat, which consists in partially comminuting and mixing the peat with water in the operation of taking it from the bed, raising and conveying the resulting fluid hydraulically, settling and removing foreign substances in the course of the flow of the material, subjecting the material to the action of a macerator capable of reducing the peat to a state of finely divided particles suspended in water, and subjecting the purified fluid to centrifugal action to separate the water of suspension.

10. In the treatment of peat, the process of comminuting and suspending peat in water, and then subjecting the fluid to centrifugal action, commencing the centrifugal action against a yielding peripheral surface, whereby the peat will become self-sealing as the centrifugal action proceeds.

11. The process of treating and handling peat, which consists in comminuting the peat and suspending the same in a finely divided state in water, separating the foreign substances from the fluid, and finally separating the peat from the water of suspension.

12. The process of handling and treating peat, which consists in thoroughly mixing the peat in a wet condition to obtain uniformity of quality and consistency and suspending the finely divided peat in water, and then subjecting it to centrifugal action to remove surplus water.

13. The process of handling and treating peat, which consists in taking portions from the successive peat layers as they lie in the bed, thoroughly mixing the same in a wet condition, to obtain uniformity of quality and consistency, completing the maceration to a state of suspension of the peat in fine particles in water, and subjecting the resulting product to centrifugal action to separate the peat from the excess water.

14. In the preparation of peat, the process which consists in reducing the peat to a state of attenuated fluidity and to uniform quality and consistency, and then separating the excess water centrifugally.

15. In the preparation of peat, the process of treatment which consists in breaking up the peat and mixing it with water to separate the peat into small particles, separating the solid impurities from the fluid, completing the maceration to a state of suspension of the peat in fine particles in water, subjecting the fluid to vacuum treatment, and then separating the water of suspension by centrifugal action.

16. In the preparation of peat, the process of treatment which consists in reducing the peat to a state of fluidity, with the peat minutely divided and suspended in the form of fine particles in water, conveying the fluid hydraulically, and separating the peat from the water of suspension by centrifugal action.

17. In the treatment of peat, the process of comminuting the peat and suspending the finely divided particles in water, then introducing the fluid into a centrifugal separator having a peripheral peat-outlet and having a water outlet near the center of the machine, preparatorily filling said peat outlet with an impervious packing, and rotating the machine and separating the peat from the water of suspension and forcing the peat through said peat-outlet, whereby the peat becomes self-sealing in the continued operation of the machine.

18. In the treatment of peat, the process of macerating the peat to a state of suspension in fine particles in water, separating the peat by centrifugal action, and subjecting the plastic peat thus obtained to heat treatments out of atmospheric contact, under successively reduced pressures.

WILLIAM H. BRADLEY.

In presence of—
RALPH SCHAEFER.
A. U. THORIEN.